United States Patent [19]
Terry

[11] Patent Number: 5,364,025
[45] Date of Patent: Nov. 15, 1994

[54] COMBINATION MOTOR COOLER AND AIR ASPIRATOR FOR CLIMATE CONTROL SYSTEM

[75] Inventor: Joseph L. Terry, Brighton, Mich.

[73] Assignee: Ford Motor Company, Dearborn, Mich.

[21] Appl. No.: 874,452

[22] Filed: Apr. 27, 1992

[51] Int. Cl.$^5$ .............................................. F24F 7/06
[52] U.S. Cl. ............................ 236/49.1; 236/DIG. 19
[58] Field of Search ...................... 236/49.1, DIG. 19; 310/62

[56] References Cited

U.S. PATENT DOCUMENTS

| | | | |
|---|---|---|---|
| 4,623,090 | 11/1986 | Heger | 236/49 |
| 4,626,720 | 12/1986 | Fukasaku et al. | 310/62 |
| 4,814,653 | 3/1989 | Hagegawa et al. | 310/62 X |

FOREIGN PATENT DOCUMENTS

| | | | |
|---|---|---|---|
| 48009 | 9/1980 | Japan | 310/62 |
| 96934 | 6/1983 | Japan | 236/DIG. 19 |
| 2029125 | 3/1980 | United Kingdom | 310/62 |

*Primary Examiner*—William E. Tapolcai
*Attorney, Agent, or Firm*—Raymond L. Coppiellie; Roger L. May

[57] ABSTRACT

A combined motor cooler and air aspirator for use in a motor vehicle climate control system comprises a forced air ventilation blower motor having an inlet port for admitting a flow of cooling air and a plurality of housing apertures for allowing the cooling air to exit the motor, a conduit for communicating air from the motor vehicle passenger compartment to the motor inlet port, and means for aspirating air through the conduit and the motor.

10 Claims, 1 Drawing Sheet

COMBINATION MOTOR COOLER AND AIR ASPIRATOR FOR CLIMATE CONTROL SYSTEM

FIELD OF THE INVENTION

The present invention is directed to a combination motor cooler and air aspirator for a climate control system. More particularly, the invention is directed to a device for providing air aspiration and motor cooling for a motor vehicle climate control system which includes a motor driven blower for forced air ventilation. The device also conveniently provides aspiration of a stream of the motor vehicle passenger compartment air past a temperature sensing device for controlling the temperature of the air discharged by the climate control system into the passenger compartment.

BACKGROUND OF THE INVENTION

It is well-known that a stream of air from the passenger compartment of a motor vehicle may be drawn over a temperature sensor, to provide control of the temperature of air discharged into the passenger compartment by the vehicle's climate control system. This air typically is aspirated from the passenger compartment via a conduit connected either to the intake housing of the climate control system blower or to the suction housing of a separate small additional blower mounted behind the dashboard of the motor vehicle.

U.S. Pat. No. 4,623,090 discloses a climate control system blower including a dual purpose fan, wherein air is aspirated from the passenger compartment of the motor vehicle by means of supplemental vanes attached to the backside of the impeller of the fan used to provide forced ventilation to the passenger compartment. This configuration, however, does not provide cooling for the blower motor.

It would be desirable to provide a combination motor cooler and air aspirator which could be integrated with the blower motor of a motor vehicle climate control system. Such a device would eliminate the need for a separate small additional blower, and would additionally provide cooling to the climate control system blower motor.

SUMMARY OF THE INVENTION

Accordant with the present invention, there surprisingly has been discovered a device which provides combined motor cooling and air aspiration, and which is integral with the blower of a motor vehicle climate control system. The device comprises:

A) a motor for driving a climate control system air blower, the motor including a motor housing inlet port for admitting a flow of cooling air to the interior of the motor, the motor further including a plurality of housing apertures for allowing cooling air to exit from the interior of the motor;

B) a conduit for communicating air from the passenger compartment of a motor vehicle to the motor housing inlet port; and C) means for aspirating air consecutively through the conduit, then the motor.

The combined motor cooler and air aspirator of the present invention is particularly useful in motor vehicle climate control systems, for providing cooling air to the blower motor, and for drawing passenger compartment air over a temperature sensor to provide automatic control of the heating and air conditioning system.

BRIEF DESCRIPTION OF THE DRAWINGS

The novel features which are characteristic of the present invention are set forth with particularity in the appended claims. The invention itself, however, both as to structure and method of use will best be understood from the accompanying description of a specific embodiment when read in connection with the drawings in which

DETAILED DESCRIPTION OF THE PREFERRED EMBODIMENT

Figure 1:
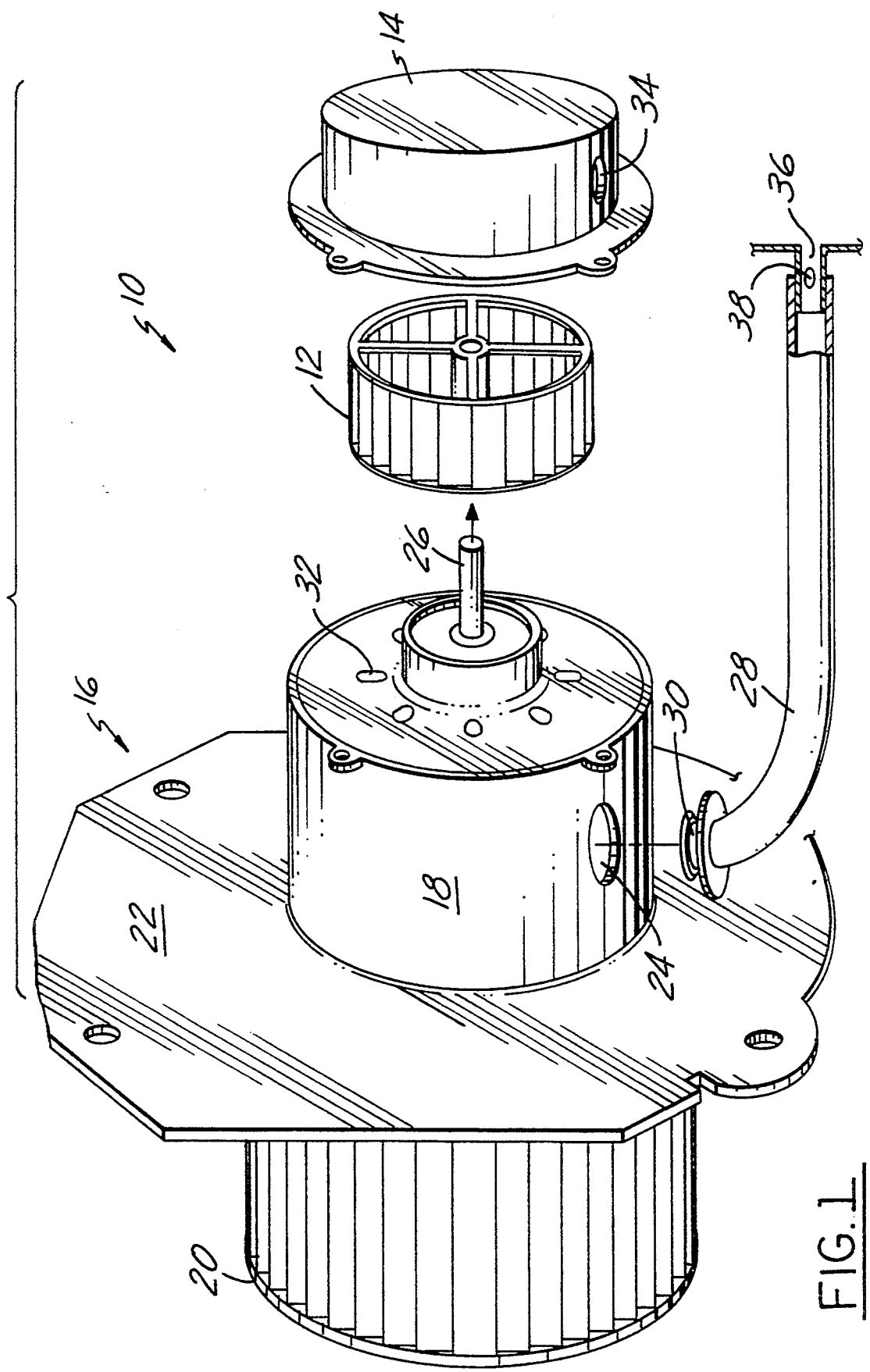
FIG. 1 is an exploded perspective view of a combination motor cooler and air aspirator according to the present invention.

Referring now to FIG. 1, there is shown generally at 10 a combination motor cooler and air aspirator integral with a motor vehicle climate control system blower, according to the present invention. The device 10 comprises, inter alia, an aspirator blower wheel 12 and a discharge housing 14. The aspirator blower wheel 12 and discharge housing 14 are coupled to a motor vehicle climate control system air blower 16.

The air blower 16 includes a permanent magnet-type direct current electric motor 18 which drives a conventional blower wheel 20. The motor 18 is mounted on a wall 22 of the blower housing and extends away from the blower housing as shown. The motor 18 includes a motor housing inlet port 24 and a shaft extension 26.

An aspirated air conduit 28 extends from a vehicle passenger compartment air inlet opening 36 to the inlet port 24. A conventional temperature sensor 38 is mounted in the passenger compartment air inlet opening 36. A nipple 30 at the end of the conduit 28 opposite the air inlet opening 36 may be press-fitted into the motor housing inlet port 24. The aspirator blower wheel 12 is mounted onto the shaft extension 26 and the discharge housing 14 is secured to the motor 18 by means of conventional fasteners (not shown).

In operation, the motor 18 is energized to rotate the climate control system blower wheel 20, to provide forced ventilation to the motor vehicle passenger compartment. Simultaneously, the aspirator blower wheel 12 is rotated within the discharge housing 14 by means of the motor shaft extension 26. The rotation of the aspirator blower wheel 12 causes air to be drawn from the motor vehicle passenger compartment through the passenger compartment air inlet opening 36, past the temperature sensor 38, thence via the conduit 28 to the motor housing inlet port 24. The aspirated air passes over the internal components of the motor 18 and exits via a plurality of housing apertures 32 in the end of the motor 18. The aspirated air then flows through the blower wheel 12 into the marginal peripheral portion of the discharge housing 14 and exits from a discharge port 34 therein.

Thus, passenger compartment air is drawn over the temperature sensor and through the climate control system forced air ventilation blower motor, thereby cooling the motor, before being discharged at a location behind the dashboard. The temperature sensor transmits a value corresponding to the temperature of the air in the vehicle passenger compartment to a conventional electronic control device which then provides a signal to the climate control system which can be used to control the temperature of the air discharged into the passenger compartment by the climate control system.

From the foregoing description, one ordinarily skilled in the art can easily ascertain the essential characteristics of the present invention, and without departing from the spirit and scope thereof, can make changes and modifications in the invention to adapt it to various usages and conditions. For example, other means may be used to aspirate the air from the apertures of the motor, such as a propeller mounted on the motor's shaft extension. Other means for aspirating air past the temperature sensor and through the conduit and motor will be readily apparent to one ordinarily skilled in the art.

I claim:

1. A combined motor cooler and air aspirator for a motor vehicle climate control system, comprising:
   A) a motor for driving a climate control system air blower, the motor including a motor housing inlet port for admitting a flow of cooling air to the interior of the motor, the motor further including a plurality of housing apertures for allowing cooling air to exit from the interior of the motor;
   B) a conduit for communicating air from the passenger compartment of a motor vehicle to the motor housing inlet port; and
   C) means for aspirating air consecutively through the conduit, then the motor.

2. The combined motor cooler and air aspirator according to claim 1, wherein the means for aspirating air through the conduit and the motor is actuated by the motor.

3. The combined motor cooler and air aspirator according to claim 1, wherein the means for aspirating air through the conduit and the motor comprises a blower wheel driven by the motor.

4. The combined motor cooler and air aspirator according to claim 1, wherein the means for aspirating air through the conduit and the motor comprises a propeller driven by the motor.

5. A combined motor cooler and air aspirator for a motor vehicle climate control system, comprising:
   A) a motor for driving a climate control system air blower, the motor including a motor housing inlet port for admitting a flow of cooling air to the interior of the motor, the motor further including a plurality of housing apertures for allowing cooling air to exit from the interior of the motor;
   B) a conduit for communicating air from the passenger compartment of a motor vehicle to the motor housing inlet port;
   C) means for aspirating air consecutively through the conduit, then the motor; and
   D) a temperature sensor positioned in the path of the air aspirated through the conduit.

6. The combined motor cooler and air aspirator according to claim 5, wherein the means for aspirating air through the conduit and the motor is actuated by the motor.

7. The combined motor cooler and air aspirator according to claim 5, wherein the means for aspirating air through the conduit and the motor comprises a blower wheel driven by the motor.

8. The combined motor cooler and air aspirator according to claim 5, wherein the means for aspirating air through the conduit and the motor comprises a propeller driven by the motor.

9. A motor vehicle having a climate control system, wherein the climate control system includes the combined motor cooler and air aspirator of claim 1.

10. A motor vehicle having a climate control system, wherein the climate control system includes the combined motor cooler and air aspirator of claim 5.

* * * * *